(12) United States Patent
Kim et al.

(10) Patent No.: US 6,398,143 B1
(45) Date of Patent: Jun. 4, 2002

(54) DRIVE LEADER AND TAKE-UP REEL FOR A TAPE DRIVE

(75) Inventors: Chan Kim, Holliston; Roy MacKinnon, Shrewsbury; George Saliba, Northboro, all of MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/670,857

(22) Filed: Sep. 26, 2000

(51) Int. Cl.$^7$ ................................. G03B 1/58
(52) U.S. Cl. ................... 242/332.4; 242/332.8; 242/532.1; 242/582
(58) Field of Search ............... 242/332.4, 332.7, 242/332.8, 532.1, 532.6, 532.7, 582, 352.4, 338, 339, 337; 360/93, 95, 96.5, 99.02, 99.03

(56) References Cited

U.S. PATENT DOCUMENTS

| | | |
|---|---|---|
| 6,050,514 A | 4/2000 | Mansbridge |
| 6,216,970 B1 * | 4/2001 | Byrne et al. ......... 242/332.8 X |
| 6,227,475 B1 * | 5/2001 | McAllister et al. .. 242/332.8 X |

* cited by examiner

Primary Examiner—William A. Rivera
(74) Attorney, Agent, or Firm—Steven G. Roeder

(57) ABSTRACT

A tape drive (10) that includes a cartridge receiver (18), a take-up reel (16) and a drive leader (32) is adapted for use with a cartridge (22) that includes a cartridge leader (28) having a cartridge buckle component (56). The drive leader (32) includes a drive buckle component (54) that engages the cartridge buckle component (56) to couple the drive leader (32) to the cartridge leader (28). The drive leader (32) includes a leader connector (88) having a connector aperture (102). The take-up reel (16) includes a hub (120) that receives the drive leader (32). Uniquely, the hub (120) including a drive component channel (146) that is sized and shaped to receive the drive buckle component (54). Preferably, the hub (120) also includes a cartridge component channel (148) that is sized and shaped to receive the cartridge buckle component (56) and a pair of member channels (150) (152) for receiving the leader connector (88). With this design, the surface of the storage tape (26) that is being wound around the take-up reel (16) is substantially a uniform distance from an axis of rotation (33) of the take-up reel (16). This reduces the amount of wear of the storage tape (26) and reduces speed variations caused by winding the tape (26) onto an eccentric surface.

31 Claims, 5 Drawing Sheets

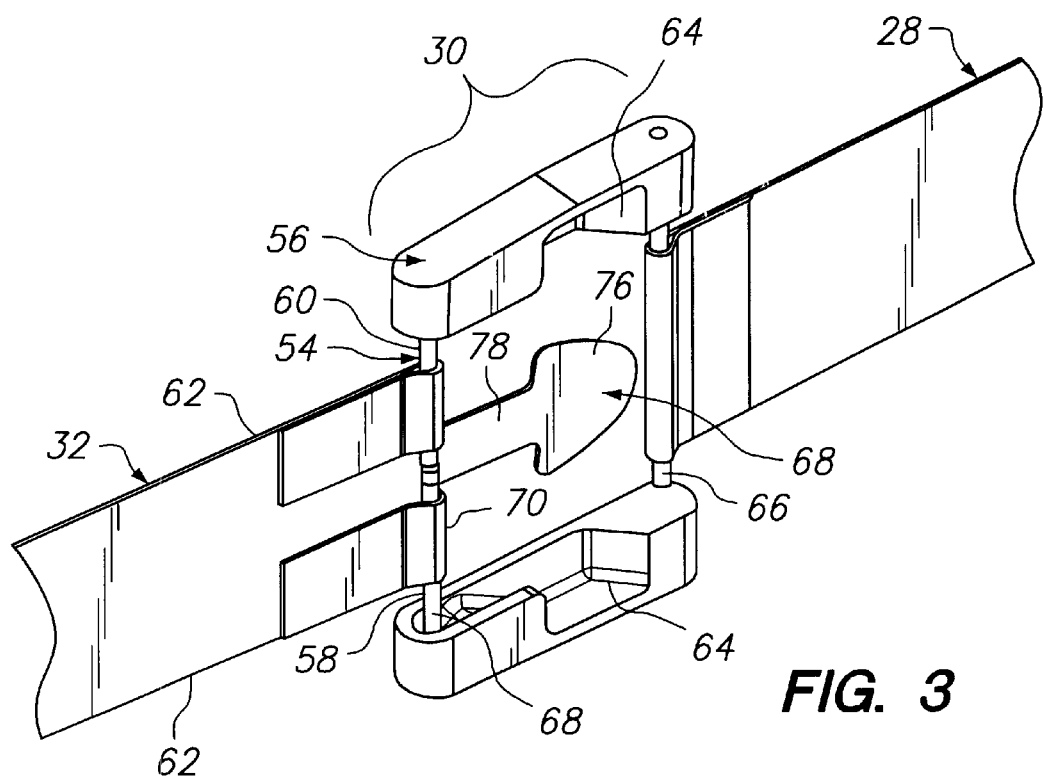
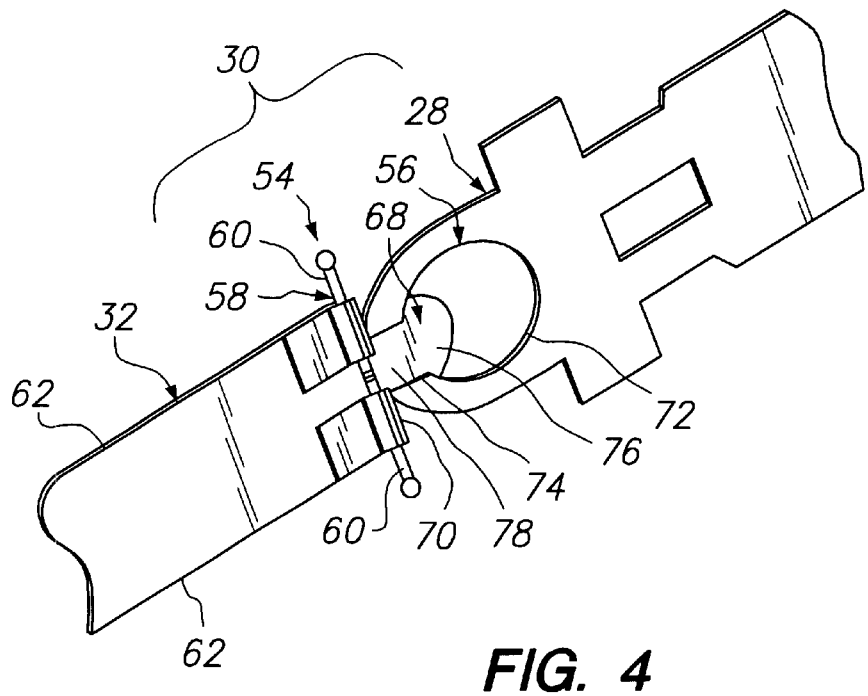

DRIVE LEADER AND TAKE-UP REEL FOR A TAPE DRIVE

FIELD OF THE INVENTION

The present invention relates generally to tape drives and cartridges that use a storage tape to store and transfer data. More specifically, the present invention relates to a tape drive having an improved drive leader and take-up reel.

BACKGROUND

Tape drives are widely used for storing information in a digital form. These tape drives commonly use a storage tape having a thin film of magnetic material which receives the information. Typically, the storage tape is moved between a pair of spaced apart reels, past a tape head assembly to record or read back information from the storage tape.

In one type of tape drive, one of the reels is part of the tape drive, while the other reel is part of a removable cartridge. For this type of tape drive, the reel that is a part of the tape drive is commonly referred to as a take-up reel, while the reel that is a part of the cartridge is commonly referred to as a cartridge reel. With this system, upon insertion of the cartridge into the tape drive, it is necessary to couple the storage tape on the cartridge reel to the take-up reel of the tape drive. After coupling, the tape is unwound from the cartridge reel, moved past the tape head assembly and wound onto the take-up reel. Next, the tape is unwound from the take-up reel, moved past the tape head assembly and wound onto the cartridge. Subsequently, the storage tape must be uncoupled from the take-up reel, prior to removing the cartridge from the tape drive system.

Typically, a buckle is automatically coupled during insertion of the cartridge into the tape drive to connect a cartridge leader of the storage tape to a drive leader of the tape drive. The procedure of connecting the drive leader with the cartridge leader is commonly referred to as "buckling" or "coupling". Subsequently, during ejection of the cartridge, the cartridge leader is unbuckled from the drive leader.

One type of buckle utilizes a bar shaped, buckle bar and a pair of spaced apart receivers that receive a portion of the buckle bar. In this design, the buckle bar is secured to the drive leader and the receivers are secured to the cartridge leader with a buckle connector bar.

Unfortunately, the buckle bar and the buckle connector bar cause one or more bumps when wound around a hub of the take-up reel. The one or more bumps deform the storage tape as the storage tape is wound around the take-up reel and the buckle. The deformation of the tape can decrease the life of the storage tape.

Further, as the tape is wound around the take-up reel, the one or more bumps cause the surface of the storage tape to be farther away from an axis of rotation of the take-up reel at the bumps than away from the bumps. This results in speed variations caused by the winding of the storage tape onto an eccentric surface. Stated another way, as a result of the bumps, different areas of the tape surface travel at different speeds relative to the axis of rotation. As a result thereof, the bumps cause the tape surface to travel at different speeds relative to the tape head assembly. This can lead to data transfer errors between the storage tape and the tape head assembly. The end result is less efficient use of the tape for recording purposes and possible damage to the tape.

In light of the above, one object of the present invention to provide a tape drive that facilitates a uniform tape speed and minimizes deformations and wear to the storage tape.

Still another object of the present invention is to provide a tape drive system having increased storage capacity and more accurate data transfer. Another object of the present invention is to provide a take-up reel and a drive leader that increases the efficiency and reliability of a tape drive.

SUMMARY

The present invention is directed to a combination for a tape drive that satisfies these objectives. The combination is adapted for use with a cartridge that includes a cartridge leader having a cartridge buckle component. The combination includes a drive leader and a take-up reel. The drive leader includes a drive buckle component. The drive buckle component engages the cartridge buckle component to couple the drive leader to the cartridge leader. The take-up reel includes a hub that receives the drive leader.

Uniquely, the hub includes a drive component channel that is sized and shaped to receive the drive buckle component. As a result thereof, the surface of the storage tape that is being wound around the take-up reel 16 is substantially a uniform distance from an axis of rotation 33 of the take-up reel 16. Stated another way, the drive buckle component does not create a bump in the storage tape that is being wound around the hub. This reduces the amount of wear of the storage tape and reduces speed variations caused by winding the tape onto an eccentric surface. Further, the constant speed of the storage tape 26 increases data transfer accuracy of the tape drive. Thus, the present invention improves the useful life of the drive leader and the reliability of the tape drive.

Preferably, the drive leader includes a first leader component, a second leader component and a leader connector. As provided herein, the leader connector connects the first leader component to the second leader component. Further, the leader connector includes a connector aperture that exposes a portion of the hub when the leader connector is wrapped around the hub. In one embodiment, the leader connector includes a pair of end members and a pair of side members that are secured together to form a rectangular, frame shaped leader connector.

Preferably, the hub also includes a cartridge component channel and a pair of member channels. The cartridge component channel is sized and shaped to receive the cartridge buckle component. Further, each of the connector channels is sized and shaped to receive one of the end members. With this design, the cartridge buckle component and the end members do not create a bump when wound around the hub.

The present invention is also a method for manufacturing a take-up reel and a method for manufacturing a drive leader.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a perspective view of a portion of a drive leader, a first embodiment of a buckle and a portion of a cartridge leader having features of the present invention;

FIG. 4 is a perspective view of a portion of the drive leader, a second embodiment of a buckle and a portion of a cartridge leader having features of the present invention;

DESCRIPTION

Figure 1:
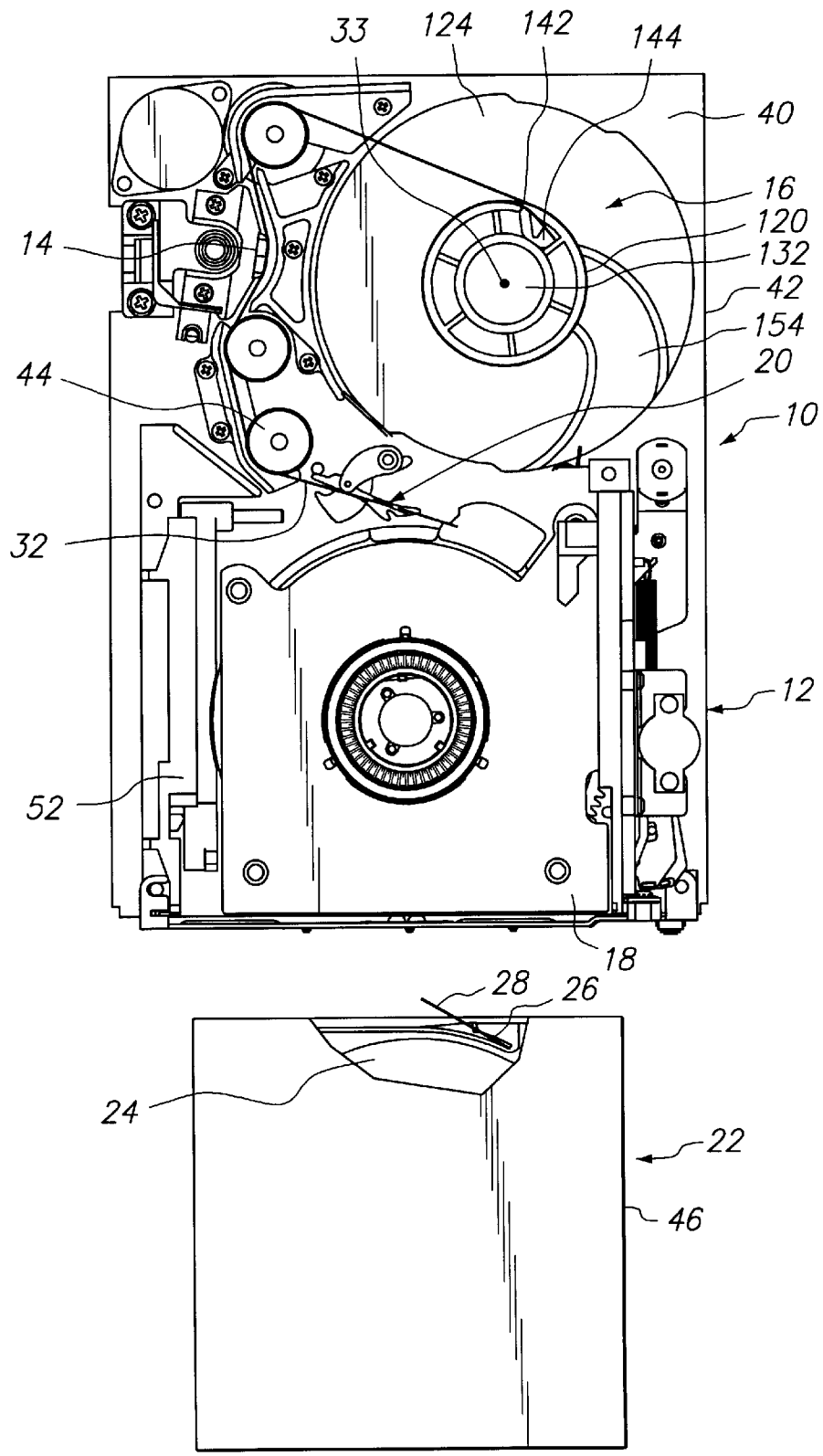
FIG. 1 is a top plan view of a portion of a tape drive and a cartridge, in partial cut-away, having features of the present invention.

Referring initially to FIG. 1, a tape drive 10 having features of the present invention includes a drive housing 12, a tape head assembly 14, a take-up reel 16, a cartridge receiver 18, a buckler 20 and a drive leader 32. The tape drive 10 is designed for use in conjunction with a cartridge 22 including a cartridge reel 24 and a storage tape 26 having a cartridge leader 28. A buckle 30 (illustrated in FIGS. 3 and 4) secures the drive leader 32 of the tape drive 10 to the cartridge leader 28.

As provided in detail below, the drive leader 32 and the take-up reel 16 are uniquely designed so that the surface of the storage tape 26 that is being wound around the take-up reel 16 is substantially a uniform distance from a hub axis of rotation 33 of the take-up reel 16. Stated another way, the buckle 30 does not create a bump under the storage tape 26 that is being wound around the take-up reel 16. This reduces the amount of wear of the storage tape 26 and reduces speed variations caused by winding the tape 26 onto an eccentric surface. The constant speed of the storage tape 26 increases data transfer accuracy between the storage tape 26 and the tape head assembly 14. Thus, the present invention improves the useful life of the drive leader 32 and the reliability of the tape drive 10.

Figure 2:
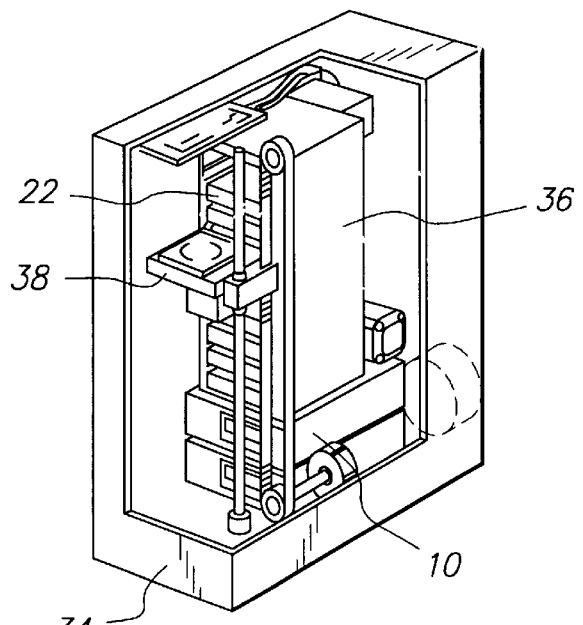
FIG. 2 is a perspective view, in partial cut-away, of a tape library having features of the present invention.

The tape drive 10 is typically installed within a computer (not shown), or a word processor (not shown). Alternately, referring to FIG. 2, the tape drive 10 can be utilized as part of a tape library 34. In this embodiment, the tape library 34 includes a plurality of cartridges 22 which are retained in a multiple cartridge magazine 36, a robotic cartridge handler 38 and a pair of tape drives 10. The robotic cartridge handler 38 selectively retrieves one of the cartridges 22 from the cartridge magazine 36 and places the cartridge 22 within one of the tape drives 10. A representative tape library 34 is sold under the trademark DLTstor™, by Quantum Corporation, the Assignee of the present invention.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of the tape drive 10 which are particularly significant to the present invention are provided herein. A representative tape drive 10 is sold by Quantum Corporation, under the trademark DLT™4000.

The drive housing 12 retains the various components of the tape drive 10. The drive housing 12, illustrated in FIG. 1, includes a base 40, four spaced apart side walls 42 and a cover (not illustrated in FIG. 1 for clarity).

The tape drive 10 includes a plurality of tape guides 44 for guiding the storage tape 26 past the tape head assembly 14 and onto the take-up reel 16. The number, design and location of the tape guides 44 can be varied to suit the design requirements of the tape drive 10. In the embodiment illustrated in the Figures, the tape drive 10 includes three, spaced apart tape guides 44 that guide the storage tape 26 along the tape path between the cartridge reel 24 and the take-up reel 16.

The tape head assembly 14 includes one or more cores (not shown) for reading and/or recording information from the storage tape 26.

The storage tape 26 stores data in a form that can be subsequently retrieved if necessary. A magnetic storage tape 26 is commonly used to store data in digital form. For conservation of space, the storage tape 26 has a tape width of preferably at least approximately one-half an inch (0.5 in). Alternately, for example, the storage tape 26 can have a tape width of between approximately four millimeters to eight millimeters (4.0 mm–8.0 mm). The storage tape 26 is initially retained on the cartridge reel 24 of the cartridge 22.

The cartridge 22 includes a substantially rectangular shaped cartridge housing 46 that encloses the cartridge reel 24 and the storage tape 26. The cartridge housing 46 includes a cartridge door (not shown for clarity) which pivots between an open door position in which the cartridge leader 28 is exposed and a closed door position.

The cartridge receiver 18 is positioned within the drive housing 12 and selectively receives the cartridge 22. The cartridge receiver 18 includes a protruding wall 52 that contacts the cartridge door (not shown) of the cartridge 22 during movement of the cartridge 22 in the cartridge receiver 18. This causes the cartridge door to move from the closed door position to the open door position.

The buckle 30 secures the drive leader 32 of the tape drive 10 to the cartridge leader 28 of the cartridge 22. The buckle 30 includes a drive buckle component 54 attached to the drive leader 32 and a cartridge buckle component 56 attached to the cartridge leader 28. The design of the buckle 30 can be varied to suit the design requirements of the tape drive 10. A couple of alternate embodiments of the buckle 30 are illustrated in the FIGS. 3 and 4.

Referring to FIG. 3, in a first embodiment of the buckle 30, the drive buckle component 54 includes a bar-shaped, buckle bar 58 that is secured to the drive leader 32. In this embodiment, the buckle bar 58 is a substantially straight piece of a rigid material, having a substantially circular cross section. The buckle bar 58 extends transversely across the drive leader 32. The buckle bar 58 includes a pair of bar ends 60 that cantilever past opposed leader edges 62 of the drive leader 32. Stated another way, each of the bar ends 60 extends away from one of the opposed leader edges 62 of the drive leader 32.

In the first embodiment of the buckle 30, the cartridge buckle component 56 includes a pair of spaced apart bar receivers 64 that are secured together with a buckle connector bar 66. Each of the bar receivers 64 is sized and shaped to receive a portion of one of the bar ends 60 to couple the drive leader 32 to the cartridge leader 28. The use of two spaced apart bar receivers 64 ensures a reliable connection between the leaders 28, 32.

It should be noted that the drive leader 32 also includes an alternate drive buckle component 68 that projects away from a leader distal end 70 of the drive leader 32. More specifically, the alternate drive buckle component 68 is mushroom tab shaped. The alternate drive buckle component 68 is not used to couple the cartridge leader 28 illustrated in FIG. 3.

FIG. 4 illustrates a second embodiment of the buckle 30. In this embodiment, the alternate drive buckle component 68 is used as part of the buckle 30. More specifically, in this embodiment, the alternate drive buckle component 68 engages the cartridge buckle component 56. In this embodiment, the cartridge buckle component 56 includes a hoop 72 and a channel 74. With this design, the alternate drive buckle component 68 allows the drive leader 32 to couple to the cartridge leader 28 that includes the hoop 72 and the channel 74. The alternate drive buckle component 68 includes a nose 76 that is dimensioned to fit through the hoop 72 but not the channel 74. The alternate drive buckle component 68 also includes a neck 78 that is designed to fit in both the hoop 72 and channel 74.

Preferably, as illustrated in FIGS. 3 and 4, the drive leader 32 includes both the drive buckle component 54 and the alternate drive buckle component 68. As illustrated in FIGS. 3 and 4, the drive buckle component 54 is typically secured to the drive leader 32 near the leader distal end 70 of the drive leader 32. Additionally, the alternate drive buckle component 68 and the drive leader 32 are formed as a continuous, unitary, component.

A more complete discussion of the buckles 30 illustrated in FIGS. 3 and 4 is provided in U.S. Pat. No. 5,971,310, issued to Saliba et al., the contents of which are incorporated herein by reference.

The buckler 20 moves relative to the cartridge receiver 18 to couple and uncouple the buckle 30. More specifically, the buckler 20 selectively retains and moves the drive leader 32 to couple the drive leader 32 to the cartridge leader 28. In the embodiment provided herein, the buckler 20 selectively retains the drive leader 32 at the buckle bar 58. Alternately, for example, the buckler 20 could engage an aperture in the drive leader 32. A more complete discussion of the buckler 20 is provided in U.S. application Ser. No. 09/276,330, filed on Mar. 25, 1999, and entitled "Buckler For A Tape Drive", the contents of which are incorporated herein by reference.

The drive leader 32 extends between the take-up reel 16 and the buckle 30. More specifically, a leader proximal end 80 of the drive leader 32 is secured to the take-up reel 16 and the leader distal end 70 of the drive leader 32 is secured to the drive buckle component 54 of the buckle 30. Referring back to FIGS. 3 and 4, a portion of the leader distal end 70 of the drive leader 32 is bent around the drive buckle component 54 to secure the drive buckle component 54. Additionally, the alternate drive buckle component 68 is integrally formed into the leader distal end 70 of the drive leader 32.

Figure 5:
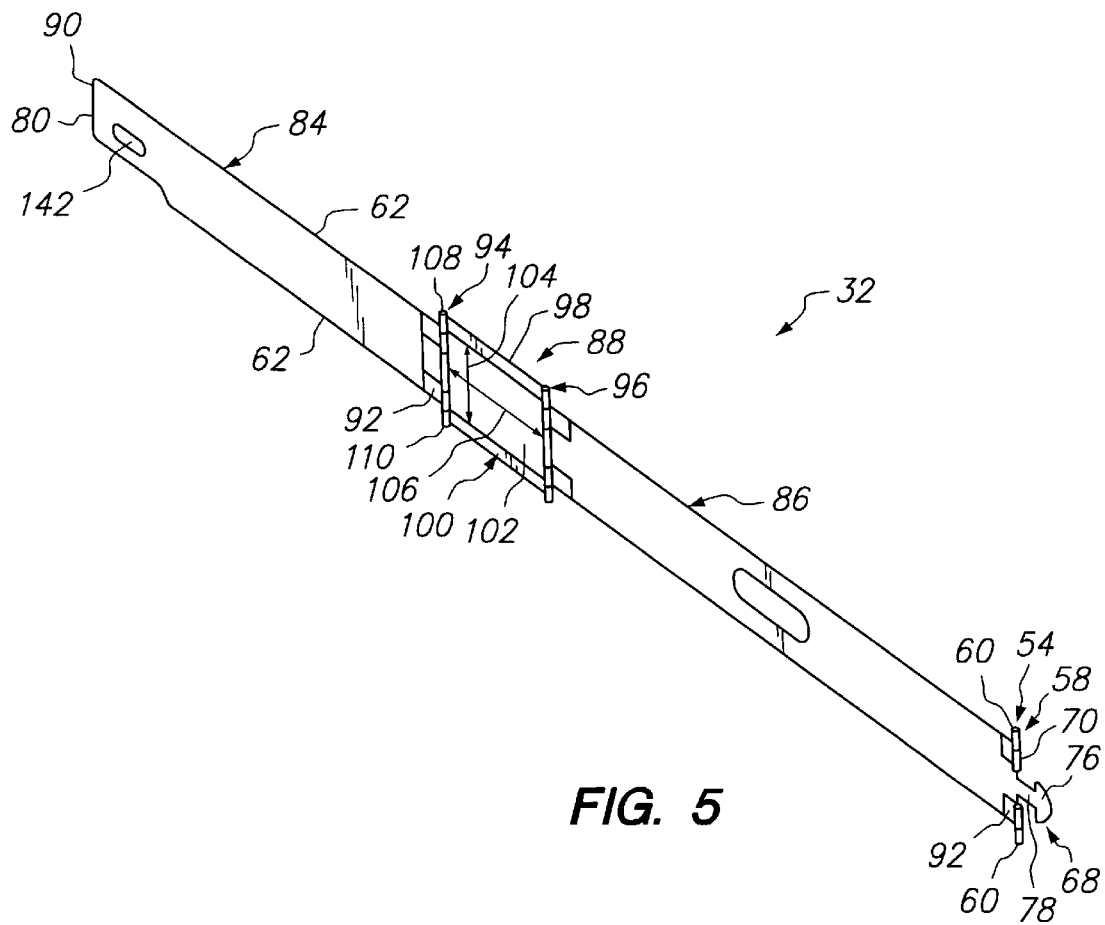
FIG. 5 is a perspective view of the drive leader.

FIG. 5 illustrates a drive leader 32 having features of the present invention. The drive leader 32 includes a first leader component 84, a second leader component 86 and a leader connector 88. Each of the leader components 84, 86 includes a component proximal end 90 and a component distal end 92. In the embodiment illustrated in FIG. 5, the component proximal end 90 of the first leader component 84 defines the leader proximal end 80 of the drive leader 32. Alternately, the component distal end 92 of the second leader component 86 defines the leader distal end 70 of the drive leader 32.

The material utilized for each of the leader components 84, 86 can be varied to suit the strength, flexibility and durability requirements of the drive leader 32. In the embodiment provided herein, each of the leader components 84, 86 is a thin, smooth, film that is made of polyethylene terephthalate ("PET"). Alternately, each of the leader components could be made of another plastic, such as another type of polyester material or a different material. The thickness of each leader component 84, 86 can be varied to suit the design requirements of the tape drive 10. For the embodiment provided herein, the thickness of each leader component 84, 86 is between approximately 125 microns and 375 microns and more preferably approximately 200 microns.

The leader connector 88 connects the first leader component 84 to the second leader component 86. The design of the leader connector 88 can be varied to suit the design requirements of the tape drive 10. In the embodiment illustrated in the Figures, the leader connector 88 includes a first end member 94, a second end member 96, a first side member 98 and a second side member 100. In this design, the members 94, 96, 98, 100 cooperate to form a substantially rectangular shaped leader connector 88 having a rectangular shaped connector aperture 102. The connector aperture 102 preferably has an aperture width 104 that is wider than the storage tape 26 and an aperture length 106 that is longer than the length between the buckle components 54, 56 after they are coupled together. As provided below, the connector aperture 102 exposes a portion of the take-up reel 16 during wrapping of the leader connector 88 around the take-up reel 16. Preferably, the leader connector 88 is centered and positioned approximately half way between the leader distal end 70 and the leader proximal end 80 of the drive leader 32.

The first end member 94 is secured to the component distal end 92 of the first leader component 84 and the second end member 96 is secured to the component proximal end 90 of the second leader component 86. The first end member 94 extends transversely across the first leader component 84 and the second end member 96 extends transversely across the second leader component 86. Each of the end members 94, 96 includes a first tip 108 and a second tip 110 that extend and cantilever from the opposed leader edges 62 of the drive leader 32. Upon assembly of the drive leader 32, the end members 94, 96 are substantially parallel and are spaced apart by the side members 98, 100.

The side members 98, 100 extend between the end members 94, 96 and secure the end members 94, 96 together on each side of the opposed leader edges 62. More specifically, the first side member 98 is secured to and extends between the first tip 108 of each end member 94, 96 and the second side member 100 is secured to and extends between the second tip 110 of each end member 94, 96. The side members 98, 100 are spaced apart a distance that is greater than a width of the storage tape 26.

In the embodiment illustrated in FIG. 5, each of the end members 94, 96 is rod shaped and each of the side members 98, 100 is flat strip shaped. However, other shapes can be used for each of the end members 94, 96 and each of the side members 98, 100. Still alternately, all of the members 94–100 that form the leader connector 88 may be made from one piece of material or separate pieces of material that are then assembled. The members 94–100 can be made of a number of materials. For example, each of the end members 94, 96 can be a rigid steel beam or rod and each of the side members 98, 100 can be a flexible, thin, smooth, film that is made of polyethylene terephthalate ("PET"). In this design, the side members 98, 100 are wrapped around the end members 94, 96 to secure the side members 98, 100 to the end members 94, 96.

In summary, the component proximal end 90 of the first leader component 84 is connected to the take-up reel 16 and the component distal end 92 of the first leader connector 84 is connected the first end member 94 of the leader connector 88. Further, the component proximal end 90 of the second leader component 86 is connected to the second end member 96 of the leader connector 88 and the component distal end 92 of the second leader component 86 is connected to the drive buckle component 54.

Figure 6:
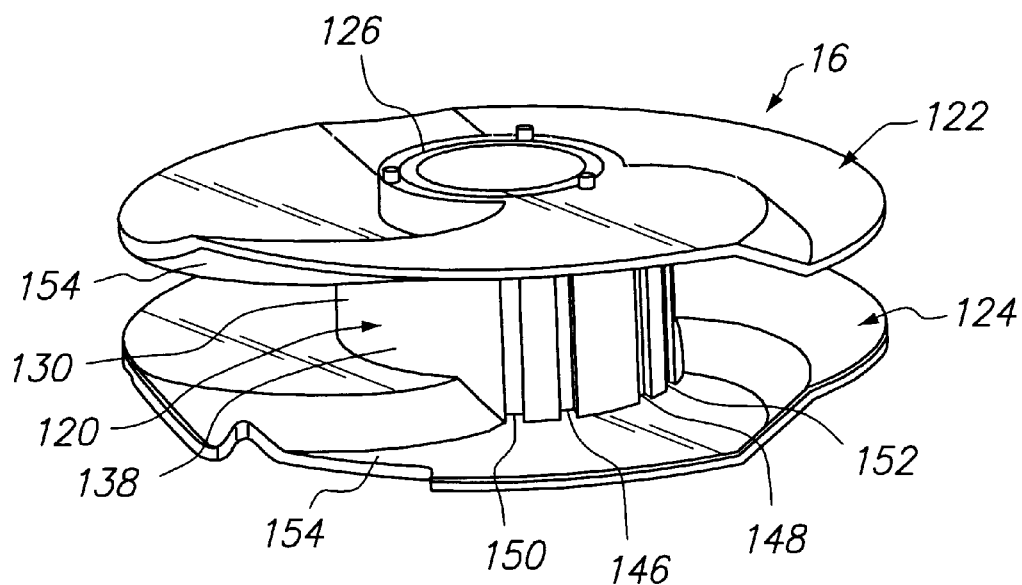
FIG. 6 is a perspective view of a take-up reel having features of he present invention.
Figure 7:
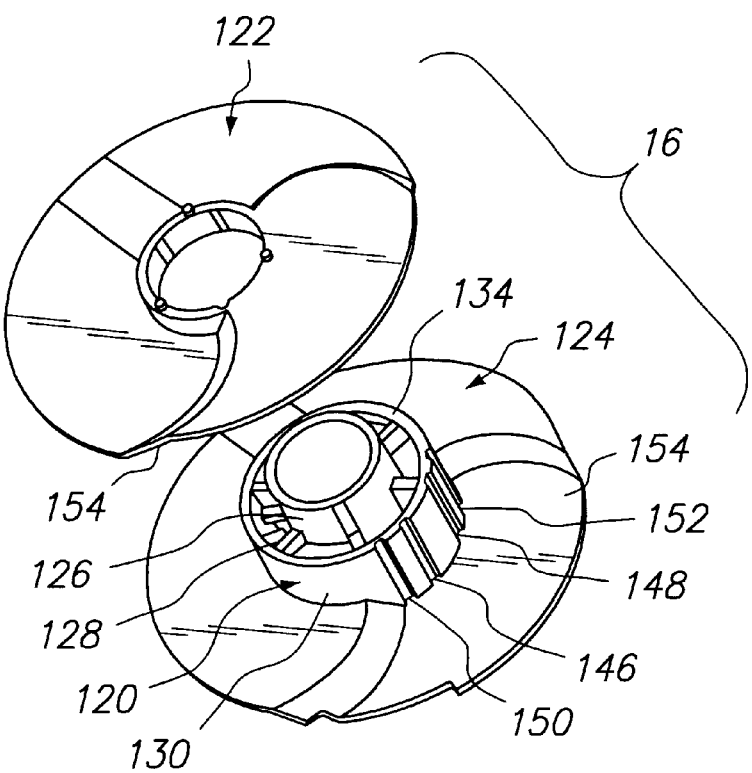
FIG. 7 is a partly exploded perspective view of the take-up reel of FIG. 6.

The take-up reel 16 receives the storage tape 26 during operation of the tape drive 10. The design of the take-up reel 16 can be varied to suit the design requirements of the tape drive 10 and the buckle 30. Referring to FIGS. 6 and 7, the take-up reel 16 includes a hub 120, an upper flange 122 and a lower flange 124 that is spaced apart from the upper flange 122.

Figure 8:
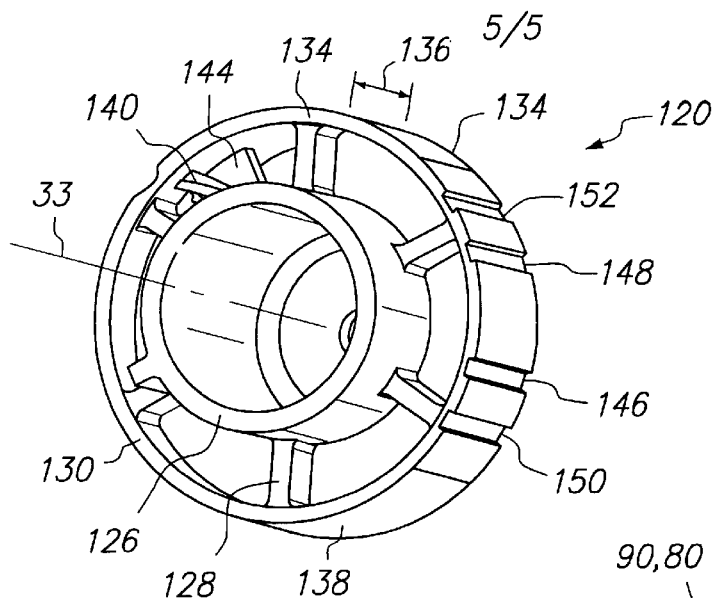
FIG. 8 is a perspective view of a hub having features of the present invention.

Referring to FIG. 8, the hub 120 is generally annular shaped and includes an inner ring 126, a plurality of spaced apart, hub supports 128, and an outer ring 130. The inner ring 126 is generally annular shaped and is secured with a reel shaft 132 (illustrated in FIG. 1) to the tape drive 10 (illustrated in FIG. 1). The reel shaft 132 and the take-up reel 16 are rotated by a reel motor (not shown) about the hub axis of rotation 33 relative to the base 40. The hub supports 128 secure the outer ring 130 to the inner ring 126. In the embodiment illustrated in the Figures, each of the hub supports 128 is beam shaped and extends between the outer ring 130 and the inner ring 126.

The outer ring 130 is generally annular shaped and is sized and shaped to receive the storage tape 26. Additionally, the outer ring 130 is substantially coaxial with the inner ring 126 about the hub axis of rotation 33. Further, the outer ring 130 includes a pair of opposed hub edges 134 and has a hub width 136 that is substantially equal to the width of the storage tape 26. The outer ring 130 also includes a hub outer circumference 138. During operation of the tape drive 10, the drive leader 32, the buckle 30, the cartridge leader 28 and the storage tape 26 are wound around the hub outer circumference 138 of the outer ring 130. In the embodiment provided herein, the outer ring 130 uniquely designed to effectively provide a substantially right cylindrical shape for wrapping the storage tape 26 after the drive leader 32 and the buckle 30 are wound onto the hub 120.

The outer ring 130 includes an attachment slot 140 for receiving a portion of the drive leader 32. More specifically, referring to FIGS. 9 and 10, the leader proximal end 80 of the drive leader 32 extends through the attachment slot 140. An attachment aperture 142 in the drive leader 32 allows the leader proximal end 80 to fit over a hub attacher 144 to attach the drive leader 32 to the take-up reel 16.

Uniquely, the outer ring 130 includes a drive component channel 146, a cartridge component channel 148, and a first member channel 150 and a second member channel 152. The drive component channel 146 is a rectangular shaped indentation that extends transversely across the hub outer circumference 138 and is sized and shaped to receive the drive buckle component 54. For the embodiment illustrated in the Figures, the drive component channel 146 has a depth and a width that is greater than the diameter of the buckle bar 58 with the drive leader 32 encircling the buckle bar 58. Similarly, the cartridge component channel 148 is a rectangular shaped indentation that extends transversely across the hub outer circumference 138 and is sized and shaped to receive the cartridge buckle component 56. For the embodiment illustrated in the Figures, the cartridge component channel 148 has a depth and a width that is greater than the diameter of the buckle connector bar 66 with the cartridge leader 28 encircling the buckler connector bar 66.

Similarly, each of the member channels 150, 152 is a rectangular shaped indentation that extends transversely across the hub outer circumference 138 and each member channel 150, 152 is sized and shaped to receive one of the end members 94, 96. Each of the member channels 150, 152 has a depth and a width that is greater than the diameter of each of the end members 94, 96 with the drive leader 32 wrapped around each end member 94, 96.

The component channels 146, 148 are spaced apart a distance that is substantially equal to the distance between the buckle components 54, 56 when the leaders 28, 32 are coupled together. The member channels 150, 152 are spaced apart a distance that is substantially equal to the distance between the end member 94, 96. Further, the component channels 146, 148 are positioned between the member channels 150, 152.

The flanges 122, 124 guide the storage tape 26 onto the hub 120. In the embodiment illustrated in the Figures, each of the flanges 122, 124 is substantially flat disk shaped. Each of the flanges 122, 124 is attached to one of the hub edges 134 of the hub 120. Each of the flanges 122, 124 includes a flange channel 154 for receiving the buckle 30 and the leader connector 88. More specifically, because the buckle components 54, 56 and the end members 94, 96 of leader connector 88 are longer than the width of the tape 26 and the hub width 136, the flange channels 154 allow the buckle 30 and the leader connector 88 to pass between the flanges 122, 124 onto the hub 120.

Figure 9:
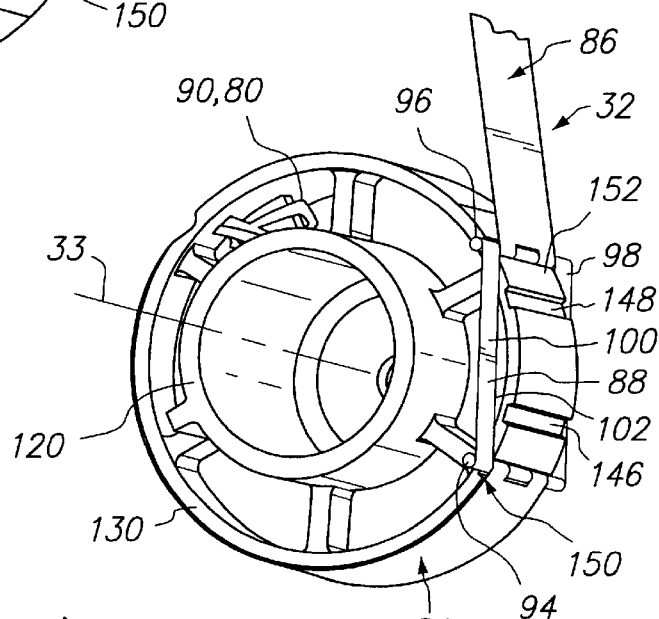
FIG. 9 is a perspective view of the hub with a portion of the drive leader wound around the hub.
Figure 10:
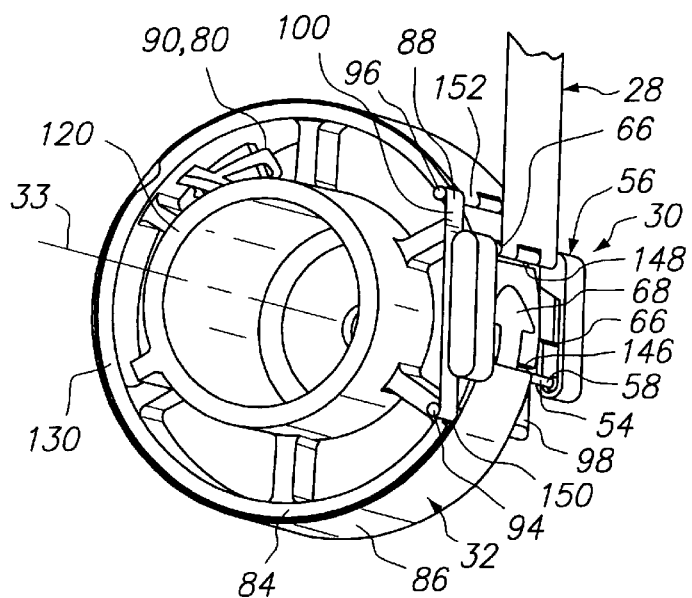
FIG. 10 is a perspective view of the hub with a portion of the drive leader wound around the hub.

FIGS. 9 and 10 illustrate the interaction between the drive leader 32 and the hub 120. In particular, FIG. 9 illustrates the hub 120 with the first leader component 84 and the leader connector 88 wrapped around the outer ring 130. Importantly, FIG. 9 illustrates that the first end member 94 fits within the first member channel 150 and the second end member 96 fits within the second member channel 152. Further, FIG. 9 illustrates that the connector aperture 102 of the leader connector 88 allows the drive component channel 146 and the cartridge component channel 148 to be exposed.

FIG. 10 illustrates the hub 120 with the first leader component 84, the leader connector 88, the second leader component 86, and the buckle 30 wrapped around the outer ring 130. Importantly, FIG. 10 illustrates that the first end member 94 fits within the first member channel 150, the second end member 96 fits within the second member channel 152, the drive buckle component 54 fits within the drive component channel 146 and the cartridge buckle component 56 fits within the cartridge component channel 148.

Importantly, the drive leader 32 and the take-up reel 16 are uniquely designed so that the surface of the storage tape 26 that is being wound around the take-up reel 16 is substantially a uniform distance from the axis of rotation 33 of the take-up reel 16. Stated another way, with the present design, the buckle 30 does not create a bump in the storage tape 26 that is being wound around the take-up reel 16. This reduces the amount of wear of the storage tape 26 and reduces speed variations caused by winding the tape 26 onto an eccentric surface. As a result thereof, the present design preserves the integrity of the tape itself by reducing the likelihood of deformation of the tape and the dead spots on the tape. This enhances the performance of the tape drive 10 and allows for increased tape densities of the storage tape 26.

While the particular tape drive 10, take-up reel 16 and drive leader 32 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A combination that is adapted for use with a cartridge and a tape drive, the cartridge including a cartridge leader having a cartridge buckle component, the combination comprising:
   a drive leader including a drive buckle component, the drive buckle component being adapted to engage the cartridge buckle component to couple the drive leader to the cartridge leader; and
   a take-up reel including a hub having a plurality of spaced apart component channels that are sized and shaped to receive the buckle components.

2. The combination of claim 1 wherein one of the component channels is sized and shaped to receive the cartridge buckle component and the other component channel is sized and shaped to receive the drive buckle component.

3. The combination of claim 1 wherein the drive leader includes a first leader component, a second leader component and a leader connector, the leader connector connecting the first leader component to the second leader component.

4. The combination of claim 1 wherein the drive buckle component includes a bar shaped buckle bar that extends transversely across the drive leader.

5. A tape drive including the combination of claim 1.

6. A tape library including the tape drive of claim 5.

7. A drive leader that is adapted for use with a cartridge and a tape drive, the cartridge including a cartridge leader having a cartridge buckle component, the tape drive including a take-up reel having a hub, the drive leader comprising:
   a drive buckle component that is adapted to engage the cartridge buckle component to couple the drive leader to the cartridge leader;
   a first leader component;
   a second leader component; and
   a leader connector, that connects the first leader component to the second leader component, the leader connector includes a leader aperture that exposes a portion of the hub when the leader connector is wrapped around the hub.

8. The drive leader of claim 7 wherein the leader connector includes a connector aperture that exposes a portion of the hub when the drive leader is wrapped around the hub.

9. The drive leader of claim 7 wherein the leader connector includes a pair of spaced apart end members and a pair of spaced apart side members that are secured together to form a rectangular, frame shaped leader connector.

10. A tape drive including the drive leader of claim 9 and a take-up reel having a hub.

11. The tape drive of claim 10 wherein the hub includes a drive component channel that is sized and shaped to receive the drive buckle component.

12. The tape drive of claim 10 wherein the hub includes a pair of member channels, each member channel being sized and shaped to receive one of the end members.

13. A tape library including the tape drive of claim 10.

14. A method for making a combination that is used with a cartridge and a tape drive, the cartridge including a cartridge leader having a cartridge buckle component, the method comprising the steps of:
   providing a drive leader including a drive buckle component, the drive buckle component being adapted to engage the cartridge buckle component to couple the drive leader to the cartridge leader;
   providing a take-up reel including a hub, the hub having a plurality of spaced-apart component channels including a drive component channel; and
   securing the drive leader to the take-up reel so that when the drive leader is wrapped around the hub the drive buckle component fits within the drive component channel.

15. The method of claim 14 wherein the step of providing a drive leader includes the step providing a drive leader that includes a leader connector having a connector aperture that exposes the drive component channel when the drive leader is wrapped around the hub.

16. The method of claim 14 wherein the step of providing a take-up reel includes the step of providing a hub that includes a cartridge component channel that is sized and shaped to receive the cartridge buckle component.

17. A combination for use with a cartridge and a tape drive, the cartridge including a cartridge leader having a cartridge buckle component, the combination comprising:
   a drive leader including (i) a drive buckle component, the drive buckle component being adapted to engage the cartridge buckle component to couple the drive leader to the cartridge leader, (ii) a first leader component, (iii) a second leader component, and (iv) a leader connector, the leader connector connecting the first leader component to the second leader component; and
   a take-up reel including a hub that receives the drive leader, the hub including a drive component channel that is sized and shaped to receive the drive buckle component.

18. The combination of claim 17 wherein the leader connector includes a connector aperture that exposes a portion of the hub when the drive leader is wrapped around the hub.

19. The combination of claim 17 wherein the leader connector includes a pair of spaced apart end members and a pair of spaced apart side members that are secured together to form a rectangular, frame shaped leader connector.

20. The combination of claim 19 wherein the hub includes a pair of member channels, each member channel being sized and shaped to receive one of the end members.

21. A method for making a combination that is used with a cartridge and a tape drive, the cartridge including a cartridge leader having a cartridge buckle component, the method comprising the steps of:
   providing a take-up reel including a hub, the hub including a drive component channel;
   providing a drive leader including (i) a drive buckle component, the drive buckle component being adapted to engage the cartridge buckle component to couple the drive leader to the cartridge leader, and (ii) a leader connector having a connector aperture that exposes the drive component channel when the drive leader is wrapped around the hub; and
   securing the drive leader to the take-up reel so that when the drive leader is wrapped around the hub the drive buckle component fits within the drive component channel.

22. The method of claim 21 wherein the step of providing a take-up reel includes the step of providing a hub that includes a cartridge component channel that is sized and shaped to receive the cartridge buckle component.

23. A combination for use with a cartridge and a tape drive, the cartridge including a cartridge leader having a cartridge buckle component, the combination comprising:
   a drive leader including a drive buckle component, the drive buckle component being adapted to engage the cartridge buckle component to couple the drive leader to the cartridge leader; and a take-up reel including a hub that receives the drive leader, the hub including a drive component channel that receives the drive buckle component, and a spaced apart cartridge component channel that receives the cartridge buckle component.

24. The combination of claim 23 wherein the drive buckle component includes a bar shaped buckle bar that extends transversely across the drive leader.

25. A tape drive including the combination of claim 24.

26. A tape library including the tape drive of claim 25.

27. A method for making a combination that is used with a cartridge and a tape drive, the cartridge including a cartridge leader having a cartridge buckle component, the method comprising the steps of:

providing a drive leader including a drive buckle component, the drive buckle component being adapted to engage the cartridge buckle component to couple the drive leader to the cartridge leader;

providing a take-up reel including a hub, the hub including a drive component channel and a spaced apart cartridge component channel; and securing the drive leader to the take-up reel so that when the drive leader is wrapped around the hub the drive buckle component fits within the drive component channel.

28. The method of claim 27 wherein the step of securing the drive leader includes securing the drive leader to the take-up reel so that when the drive leader is wrapped around the hub the cartridge buckle component fits within the cartridge component channel.

29. The method of claim 27 wherein the step of providing a drive leader includes the step providing a drive leader that includes a leader connector having a connector aperture that exposes the drive component channel when the drive leader is wrapped around the hub.

30. The method of claim 29 wherein the step of providing a take-up reel includes providing the hub having a plurality of spaced-apart member channels that are sized and shaped to receive a portion of the leader connector.

31. A combination for use with a cartridge and a tape drive, the cartridge including a cartridge leader having a cartridge buckle component, the combination comprising:

a drive leader including (i) a drive buckle component, the drive buckle component being adapted to engage the cartridge buckle component to couple the drive leader to the cartridge leader, (ii) a first leader component, (iii) a second leader component, and (iv) a leader connector, the leader connector connecting the first leader component to the second leader component, the leader connector including a pair of spaced apart end members and a pair of spaced apart side members that are secured together to form a rectangular, frame-shaped leader connector; and a take-up reel including a hub that receives the drive leader, the hub including (i) a plurality of spaced-apart component channels that are sized and shaped to receive the buckle components, and (ii) a plurality of spaced-apart member channels that are sized and shaped to receive the side members;

wherein the leader connector includes a connector aperture that exposes a portion of the hub when the drive leader is wrapped around the hub.

\* \* \* \* \*